C. A. TATUM.
DEVICE FOR MEASURING GLASS.
APPLICATION FILED JUNE 2, 1916.

1,218,492.

Patented Mar. 6, 1917.

WITNESSES
R A Balderson
J. B. Bluming

INVENTOR
Charles A. Tatum
by Bakewell, Byrnes Parmelee
Attys

UNITED STATES PATENT OFFICE.

CHARLES ALBERT TATUM, OF NEW YORK, N. Y.

DEVICE FOR MEASURING GLASS.

1,218,492.

Specification of Letters Patent. Patented Mar. 6, 1917.

Application filed June 2, 1916. Serial No. 101,324.

*To all whom it may concern:*

Be it known that I, CHARLES ALBERT TATUM, a citizen of the United States, residing at New York, in the county of New York and State of New York, have invented a new and useful Device for Measuring Glass, of which the following is a full, clear, and exact description, reference being had to the accompanying drawings, forming part of this specification, in which:—

Figure 1:
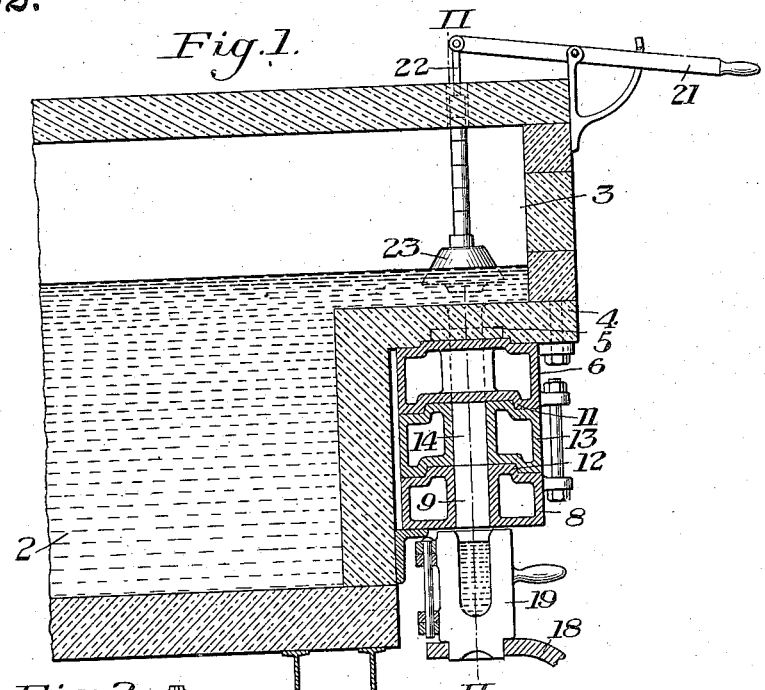
Figure 1 is a longitudinal section through a portion of a glass furnace having one form of my improved measuring device applied thereto.
Figure 2:
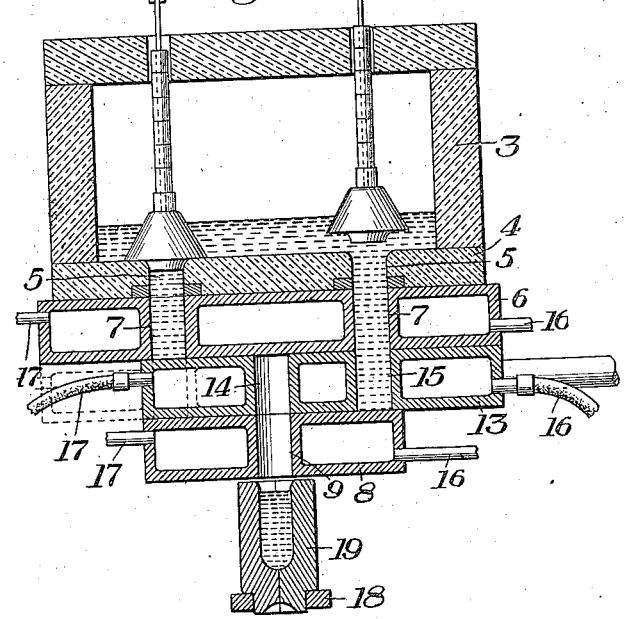
Fig. 2 is a sectional view on the line II—II of Fig. 1.

This invention relates to an improvement in glass measuring devices, and is designed to provide a simple and efficient device for measuring successive predetermined quantities of molten glass for delivery to molds in which bottles and various other articles are pressed into shape, or pressed and blown.

My invention provides a device of this character which can readily be connected to an extension or forehearth of a glass furnace, or other receptacle containing molten glass, and from which the proper quantities of glass for each mold can be readily and quickly measured and delivered to the molds. The precise nature of my invention will be best understood by reference to the accompanying drawing, which will now be described, it being premised, however, that various changes can be made in the details of construction and the general arrangement of the parts, without departing from the spirit and scope of my invention as defined in the appended claims.

Referring to the construction shown in the drawings, the numeral 2 designates a glass furnace having a forehearth or extension 3. The overhanging bottom 4 of this extension, or forehearth has two separated feed-out openings 5. 6 is a member which is fixedly connected to the bottom 4 or to the furnace in any desired manner; and which is provided with two feed openings 7 therethrough which are designed to register respectively with the openings 5. 8 is a delivery member secured to the furnace below the member 6 and formed with a single delivery opening 9 therethrough. The members 6 and 8 are each provided with suitable guiding surfaces, such as shown at 11 and 12. Mounted for reciprocating sliding movement between the two members 6 and 8, is a measuring member 13 having its upper and lower surfaces provided with guiding portions which coöperate with the guiding surfaces 11 on the members 6 and 8, respectively. The member 13 is provided with two measuring openings 14 and 15, each of which can be brought to register with one of the openings in the members 6 and 8.

The three members 6, 8 and 13 are preferably of hollow form, and each is provided with inlet pipe 16 and outlet pipe 17 for the circulation of a cooling medium such as air or water, so as to prevent the parts from becoming overheated. The members may be formed of any suitable refractory material.

18 designates a mold carrier for the molds or other containers 19. Each of the openings 5 is provided with a controlling stopper 23 which is secured to a rod 22 actuated by a lever 21.

The operation is as follows: The movable measuring member 13 is moved to a position in which one of its measuring openings or cavities registers with one of the openings 7 in the feed member 6, so as to permit glass to flow into the measuring opening, which, at this time, is out of register with the opening in the delivery member 8. The measuring member is then shifted to bring the filled measuring opening into alinement with the opening in the delivery member and thus feed its contents through said opening into the mold 19. This movement of the member 13 brings the other measuring opening therein into register with the other feed opening in the member 6, so that while one of the measuring openings is being discharged, the other measuring opening is being filled. The member 13 is then moved in the opposite direction to bring the last filled measuring opening into register with the delivery opening and the emptied measuring opening into register with the other feed opening in the member 6. This movement of the member 13 is repeated throughout the operation. The movements of said member cause it to act as a shear to shear the column of glass.

My invention provides a measuring feed device which is extremely simple in its construction and mode of operation, and by means of which successive measured quantities of the molten glass may be properly delivered from a tank or other receptacle into molds or forming devices. I do not desire to limit myself to the particular embodiments of my invention which I have herein shown and described, as it is obvious that various changes may be made therein. Thus, instead of forming the member 6 as a separate member secured to the forehearth bottom 4, said member may be formed as a part of said bottom or of the furnace. Various other changes may be made in the details of construction and arrangement of the parts.

I claim:

1. The combination of a furnace for melting glass having a plurality of openings through a portion of the bottom thereof, of a molten glass measuring and delivering device connected thereto, said measuring and delivering device comprising a stationary feed member having two openings therethrough communicating with openings through the bottom of the furnace, a stationary delivery member, and a reciprocating measuring member having a plurality of measuring cavities therein, said measuring member being movably mounted intermediate the feeding and discharge members, whereby its measuring cavities may be alternately brought into receiving and delivering relation to the openings in the feeding and discharge members; substantially as described.

2. The combination of a furnace for melting glass having a plurality of openings through a portion of the bottom thereof, of a molten glass measuring and delivering device connected thereto, said measuring and delivering device comprising a stationary feed member having two openings therethrough communicating with openings through the bottom of the furnace, a stationary delivery member having an opening therethrough intermediate the openings through the feed member, and a reciprocating measuring member having a plurality of measuring cavities therein, the distance between the measuring cavities being equal to one half the distance between the cavities in the feed member, said measuring member being movably mounted intermediate the feeding and discharging members, whereby one of its measuring cavities is in register with one of the openings through the feed member while the other is in register with the opening through the delivery member, so that the glass from one of said openings will be passing through the delivery opening while the other opening is being charged; substantially as described.

3. Means for measuring and delivering molten glass, comprising a stationary feed-ing member having a plurality of feed openings therethrough communicating with a source of supply of molten glass, a movable measuring member directly below the feed-ing member and having a plurality of measuring cavities therethrough, and a fixed delivery member immediately below the measuring member and having a single discharge opening, the openings in said members being arranged whereby as the measuring member is shifted one of its measuring openings will be brought into register with one of the feeding openings and another measuring opening will be brought into register with the delivery opening, substantially as described.

4. The combination of a furnace for melting glass having a plurality of openings through a portion of the bottom thereof, of a molten glass measuring and delivering device connected thereto, said measuring and delivering device comprising a stationary feed member having two openings therethrough communicating with openings through the bottom of the furnace, a stationary delivery member, a reciprocating measuring member having a plurality of measuring cavities therein, said measuring member being movably mounted intermediate the feeding and discharge members, whereby its measuring cavities may be alternately brought into receiving and delivering relation to the openings in the feeding and discharge members, and means for regulating the temperature of each of said members; substantially as described.

In testimony whereof, I have hereunto set my hand.

CHARLES ALBERT TATUM.

Witnesses:
 Thomas A. Mulligan,
 Geo. J. Leitch.